(12) United States Patent
Garner, IV et al.

(10) Patent No.: US 11,244,290 B1
(45) Date of Patent: Feb. 8, 2022

(54) SYSTEMS, METHODS, AND STORAGE MEDIA FOR PRE-APPROVING ONBOARDING TO A PAYMENT PLATFORM

(71) Applicant: Wells Fargo Bank, N.A., San Francisco, CA (US)

(72) Inventors: Andrew J. Garner, IV, State Road, NC (US); Lisa G. Hukari, Mill Valley, CA (US); Timothy R. Knowlton, Mill Valley, CA (US); Laura Lee Orcutt, Chanhassen, MN (US); Paul Vittimberga, Oakland, CA (US); Lolita Wang, Hermosa Beach, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 66 days.

(21) Appl. No.: 16/149,830

(22) Filed: Oct. 2, 2018

(51) Int. Cl.
*G06Q 20/06* (2012.01)
*G06Q 20/40* (2012.01)

(52) U.S. Cl.
CPC .............. *G06Q 20/06* (2013.01); *G06Q 20/40* (2013.01)

(58) Field of Classification Search
CPC ........ G06Q 20/06; G06Q 20/04; G06Q 20/00; G06Q 20/38; G06Q 30/0201; G06Q 30/00; G06Q 20/10; G06Q 20/3674; G06Q 20/4014; G06Q 30/02; G06Q 30/0215; G06Q 20/12; G06Q 20/202; G06Q 20/3223; G06Q 20/36; G06Q 20/363; G06Q 20/40; G06Q 30/0255; G06Q 20/22; G06Q 20/322; G06Q 20/325; G06Q 20/389; G06Q 30/0224; G06Q 30/0227; G06Q 30/0251; G06Q 30/0269; G06N 3/0454; G06N 3/063; G06N 3/08; G06N 5/04; H04W 4/50
See application file for complete search history.

(56) References Cited

U.S. PATENT DOCUMENTS

| | | |
|---|---|---|
| 7,873,573 B2 | 1/2011 | Realini |
| 8,412,625 B2 | 4/2013 | Pilo' |
| 8,600,846 B2 | 12/2013 | Lee |
| 8,768,784 B1 | 7/2014 | Varadarajan et al. |
| 8,799,152 B2 | 8/2014 | Keresman et al. |
| 9,635,106 B2 | 4/2017 | Lakshmegowda et al. |

(Continued)

OTHER PUBLICATIONS

Ting, Michael; "Matchmaker or Marketplace: Which Is Yor Platform?", https://www.hyperwallet.com/resources/fintech-payout-innovation/matchmaker-or-marketplace-which-is-your-platform/, Jun. 28, 2016. 4 pages.

*Primary Examiner* — Namrata Boveja
*Assistant Examiner* — Divesh Patel
(74) *Attorney, Agent, or Firm* — Foley & Lardner LLP

(57) ABSTRACT

Systems, methods, and storage media for pre-approving onboarding to a payment platform, executing on a processing device are disclosed. Exemplary implementations may: access a node network; determine a first business entity associated with a first node of the plurality of nodes is not a member of a payment platform; determine a total strength of connections of the first node to one or more nodes of the plurality of nodes exceeds a predetermined threshold value; and flag the first node of the plurality of nodes for an offer of onboarding to the payment platform consequent to determining the total strength of connections of the first node to the one or more nodes of the plurality of nodes exceeds the predetermined threshold value.

24 Claims, 4 Drawing Sheets

(56) References Cited

U.S. PATENT DOCUMENTS

| | | | |
|---|---|---|---|
| 9,679,299 B2 | 6/2017 | Yoder et al. | |
| 9,697,520 B2 | 7/2017 | MacLlwaine et al. | |
| 9,715,709 B2 | 7/2017 | Carlson | |
| 9,786,012 B2 | 10/2017 | Besman et al. | |
| 9,892,400 B1* | 2/2018 | Grassadonia | G06Q 20/227 |
| 2004/0034570 A1* | 2/2004 | Davis | G06Q 30/0229 |
| | | | 705/7.31 |
| 2007/0250450 A1 | 10/2007 | Ramlau-Hansen et al. | |
| 2009/0228830 A1* | 9/2009 | Herz | G06F 16/26 |
| | | | 715/808 |
| 2011/0106607 A1* | 5/2011 | Alfonso | G06Q 30/0224 |
| | | | 705/14.25 |
| 2011/0112912 A1 | 5/2011 | Wu | |
| 2011/0131096 A1 | 6/2011 | Frew et al. | |
| 2013/0232130 A1 | 9/2013 | Jellum | |
| 2013/0332255 A1 | 12/2013 | Carlson et al. | |
| 2014/0257922 A1 | 9/2014 | Jouhikainen et al. | |
| 2015/0120647 A1* | 4/2015 | Miles | H04L 41/142 |
| | | | 707/609 |
| 2015/0301815 A1* | 10/2015 | Tervo | G06Q 30/0214 |
| | | | 717/178 |
| 2017/0236216 A1* | 8/2017 | Sarkar | G06Q 40/12 |
| | | | 705/30 |
| 2017/0300912 A1* | 10/2017 | Narasimhan | G06Q 20/3827 |
| 2019/0197102 A1* | 6/2019 | Lerner | H04L 51/02 |
| 2020/0126144 A1* | 4/2020 | Shao | G06N 5/04 |

* cited by examiner

US 11,244,290 B1

SYSTEMS, METHODS, AND STORAGE MEDIA FOR PRE-APPROVING ONBOARDING TO A PAYMENT PLATFORM

BACKGROUND

The proliferation of the internet has fundamentally changed various aspects of individuals' lives, such as communication, work, education, finance, social and personal relationships, etc. For example, the internet has remarkably increased the amount of information available and decreased the transaction cost of obtaining such information. It has also enabled new ways to analyze information available to provide platforms to make interactions between entities faster and easier.

SUMMARY

One aspect of the present disclosure relates to a system configured for pre-approving onboarding to a payment platform, executing on a processing device. The system may include one or more hardware processors configured by machine-readable instructions. The processor(s) may be configured to access a node network. A plurality of nodes of the node network may include data associated with a plurality of business entities. Strength of connections between nodes may be weighted according to a number of transactions between the respective associated business entities. The processor(s) may be configured to determine a first business entity associated with a first node of the plurality of nodes is not a member of a payment platform. The processor(s) may be configured to determine a total strength of connections of the first node to one or more nodes of the plurality of nodes exceeds a predetermined threshold value. The processor(s) may be configured to flag the first node of the plurality of nodes for an offer of onboarding to the payment platform consequent to determining the total strength of connections of the first node to the one or more nodes of the plurality of nodes exceeds the predetermined threshold value.

Another aspect of the present disclosure relates to a method for pre-approving onboarding to a payment platform, executing on a processing device. The method may include accessing a node network. A plurality of nodes of the node network may include data associated with a plurality of business entities. Strength of connections between nodes may be weighted according to a number of transactions between the respective associated business entities. The method may include determining a first business entity associated with a first node of the plurality of nodes is not a member of a payment platform. The method may include determining a total strength of connections of the first node to one or more nodes of the plurality of nodes exceeds a predetermined threshold value. The respective associated business entities of the one or more nodes may be not a member of the payment platform. The method may include flagging the first node of the plurality of nodes for an offer of onboarding to the payment platform consequent to determining the total strength of connections of the first node to the one or more nodes of the plurality of nodes exceeds the predetermined threshold value.

Yet another aspect of the present disclosure relates to a non-transient computer-readable storage medium having instructions embodied thereon, the instructions being executable by one or more processors to perform any of the method components above for pre-approving onboarding to a payment platform. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
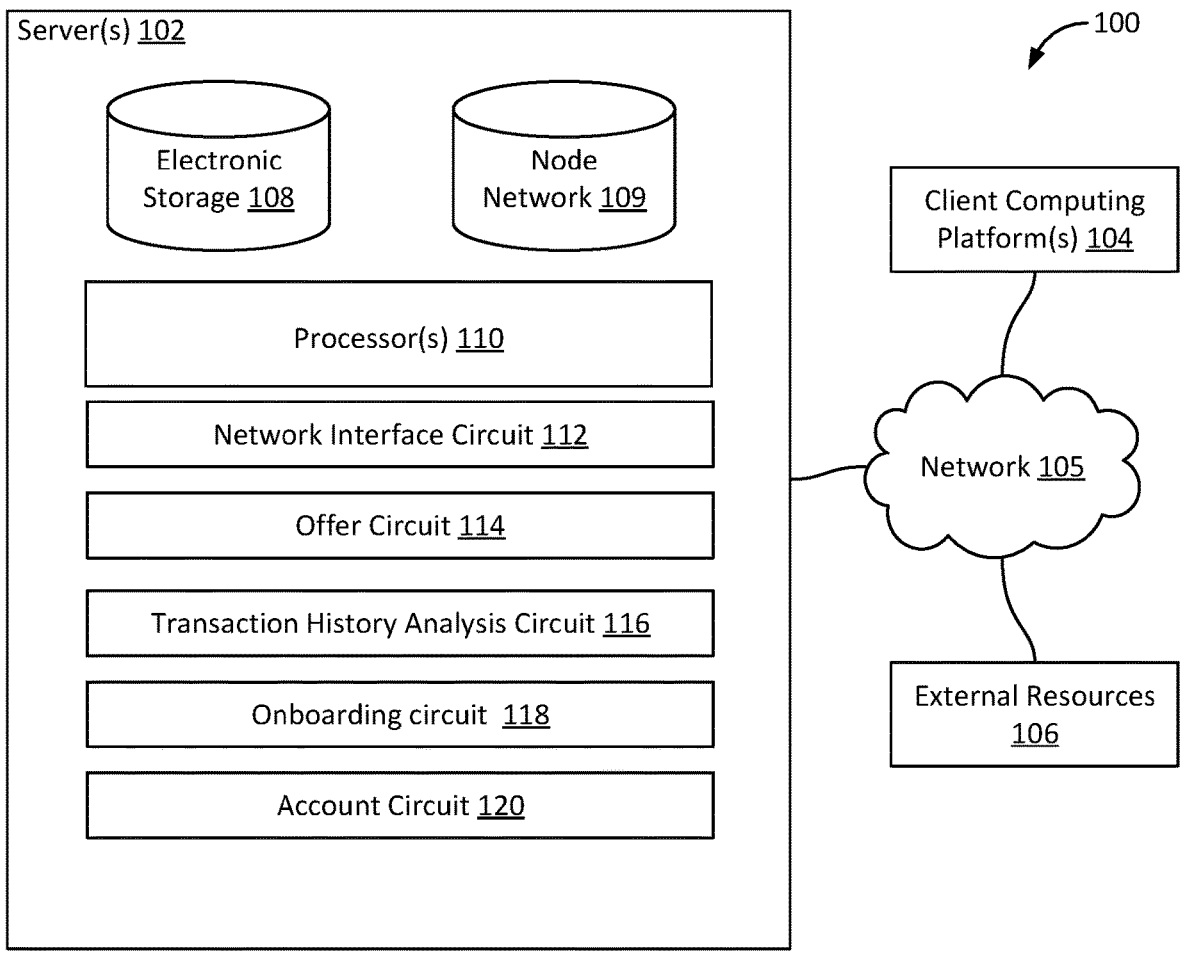
FIG. 1 illustrates a system configured for pre-approving onboarding to a payment platform, in accordance with one or more implementations.

Aspects of the disclosure relate to onboarding and authenticating buyers and sellers to a platform. The platform may handle payments and fee transactions between buyers and sellers that are participating in the platform. In some implementations, handling payments and/or fee transactions by the platform comprises the platform using existing payment tools that may otherwise also be accessible outside the platform. The existing payment tools may have already been used for payments between the respective entities prior to onboarding and/or authenticating of one or more of the respective entities to the platform. The buyers and sellers may be business of various sizes (e.g., sole proprietors, independent contractors, small businesses, medium businesses, large businesses, etc.). Help with onboarding and authenticating may include automatic performing of underwriting where necessary, pre-approved onboarding, and enticements for buyers and sellers to join the platform. In some implementations, a node network of businesses and their interconnections is maintained to provide data for faster onboarding and identification of businesses for which to configure offers for onboarding.

In some implementations, onboarding and authenticating business entities to a platform comprises accessing a node network. The node network may comprise individual nodes, each associated with an entity (e.g., a business entity) where information is gathered and analyzed about how the entities associated with the nodes are interacting and strength of relationship between entities. In some implementations, one or more connections between nodes indicate a relationship between entities. A subset of entities with nodes in the node network may be participating in the platform. Connections between nodes may be indicative of types of transactions, a number of transactions, frequency of transactions, other connections between the entities, and the like. In some implementations, the connections between two or more nodes are analyzed to determine if a particular entity may be receptive to an onboarding offer or an offer to learn more about the benefits of a function or feature of the platform. Access to the platform can increase the speed, reliability, cost effectiveness, convenience, and the like of transactions between entities that are part of the platform. In some implementations, information analyzed through transaction history is used to preapprove a functionality available on the platform to include in an offer to join the platform. In some implementations, information analyzed through connections in the node network is used to preapprove a functionality available on the platform to include in an offer to join the platform. In some implementations, information analyzed through connections in the node network (e.g., transaction activity between two nodes) is used to generate one or more specific benefits of joining the platform or one or more projected savings upon joining the platform.

In some implementations, a node network comprising nodes associated with entities (e.g., business) is built up for use by the platform. The node network connection information may be analyzed to predict entities receptive to an onboarding offer to a platform comprising functionality to handle payments and fees between entities. In some implementations, handling payments by the platform comprises the platform using existing payment tools that may be accessible outside the platform. The existing payment tools may have already been used for payments between the respective entities.

In some implementations, a solution to a technical problem of using a computing device and a node network comprising connections to entities to predict receptibility to an offer to join a platform comprises identifying transactions between buying entities and selling entities and using the transactions to create or update connections between nodes of the node network. In some implementations, connections are created or updated automatically between nodes of the node network through analysis of transaction data. Analysis of transaction data may also be used to identify an entity for the creation of a new node of the node network. Feedback may be used to correct incorrect connections, update weight values of connections, and prevent incorrect connections based on similar names of entities. Additional information may be used to help in the correct creation or updating of connections, e.g., data from public databases, volunteered data, available geographical location information, and the like.

In some implementations, a solution to a technical problem of using a computing device to pre-approve and/or activate functionality associated with an onboarding offer to a platform comprises predicting entities that may be receptive to an offer based on a node network and sending the offer with information on the pre-approved or activated functionality. In some implementations, the offer may direct a user of a computing device associated with the entity to a landing page, website, application, etc. to communicate the offer and receive acceptance of the offer. Logos and other visuals associated with entities to which the offeree already has connections to that are already on the platform may be displayed. In some implementations, size, color, prominence on the screen, and other visual indications may be adjusted to represent a strength of a connection between the respective entity and the offeree. Visuals/logos show all the businesses connected to the potential customer that are already on the platform (from Node Network data). In some implementations pre-approved or activated functionality based on analysis of available transaction data (e.g., transaction data stored in the node network data) is used to immediately give access to the pre-approved or activated functionality upon acceptance of the offer (e.g., one-click onboarding). Transaction data may also be used to ensure identification of the entity with sufficient probability of accuracy. In some implementations, other sources of information are also used for verification, including available third-party information (e.g., articles of incorporation), analyzed invoices from transactions between entities. In some implementations, information from the analyzed data is used to fill in missing data needed in the onboarding process.

In some implementations, a solution to a technical problem of visually representing connections between entities of a node network comprises displaying Logos and other visuals associated with entities connected in the node network. In some implementations, size, color, prominence on the screen, and other visual indications may be adjusted to represent a strength of a connection between two nodes of the node network. Visuals/logos may show all entities connected to a respective entity in the node network that are already on a platform.

FIG. 1 illustrates a system 100 configured for pre-approving onboarding to a payment platform, executing on a processing device, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction circuits. The instruction circuits may include computer program circuits. The instruction circuits may include one or more of a network interface circuit 112, an offer circuit 114, a transaction history analysis circuit 116, an onboarding circuit 118, an account circuit 120, and/or other instruction circuits.

Network interface circuit 112 may be configured such that data passing through the network interface circuits 112 can be encrypted such that the network interface circuit 112 is a secure communication module. The network 105 enables components of the system 100 to communicate with each other (e.g., the server(s) 102). The network 105 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 105 includes the internet.

Offer circuit 114 may be configured to determine an entity to send an offer. In some implementations offer circuit 114 is configured to access a node network 109. A plurality of nodes of the node network 109 may include data associated with a plurality of entities (e.g., sole proprietors, independent contractors, small businesses, medium businesses, large businesses, etc.). Strength of connections between nodes may be weighted according to a number of transactions between the respective associated entities. In some implementations, offer circuit 114 is configured to determine an entity does not have an associated node in the node network. The entity may be identified by analyzing transaction history between the entity and one or more entities with corresponding nodes in the node network 109. Offer circuit 114 may be configured to determine a first entity that is associated with a first node of a plurality of nodes is not a member of a platform (e.g., a payment platform). In some implementations, the offer circuit 114 is configured to determine that a total strength of connections of the first node to one or more nodes of the plurality of nodes exceeds a predetermined threshold value. The respective entities associated with the one or more nodes may already be on or using the payment platform. In some implementations offer circuit 114 is configured to flag the first node of the plurality of nodes for an offer of onboarding to the payment platform consequent to determining that the total strength of connections of the first node to the one or more nodes of the plurality of nodes exceeds the predetermined threshold value. The offer may include data including a strength of connections between the first entity and the plurality of entities. In some implementations the offer circuit 114 is configured to determine a data field associated with a pre-approval of onboarding to the payment platform of the first entity is incomplete. Data to complete the data field may be obtained from transaction history analysis circuit 116. In some implementations offer circuit 114 is configured to select a parameter for inclusion in an offer. The parameter may be associated with a functionality of the payment platform. In some implementations, joining an entity to the platform may include creating an account on the payment platform, a configuration of the created account based on including the functionality of the payment platform in the offer. Selection of the first parameter may be based on analyzing the transaction history using transaction history analysis circuit 116. In some implementations, the offer circuit 114 is configured to send the offer to a device associated with the entity (e.g., a client computing platform 104). In some implementations, the offer circuit 114 is configured to receive an acceptance to the offer from the device associated with the entity (e.g., a client computing platform 104).

Transaction history analysis circuit 116 may be configured to analyze a transaction history associated with an entity. In some implementations, transaction history analysis circuit 116 is configured to analyze a transaction history between two or more entities associated with nodes in a node network 109. The transaction history analysis circuit 116 may be configured to determine types of transactions, total number of transactions, frequency of transactions, and the like between the two or more entities. In some implementations, the transaction history is obtained from a different source than the node network 109. In some implementations, the transaction history analysis circuit 116 is configured to analyze transaction history for data that can be used in a data field that is required for an offer to send to an entity. The data field may also be a data field required for onboarding the entity to a platform (e.g., a payment platform). Analyzing the transaction history may include determining a value of a parameter associated with the transaction history exceeds a predetermined threshold value. In some implementations, the transaction history analysis circuit 116 may be configured to determine types of transactions, total number of transactions, frequency of transactions, and the like between two or more entities that have connections to a common entity. In some implementations, the transaction history analysis circuit 116 is configured to use analytics to determine a more efficient flow of transactions in a speculative configuration where an entity has joined the platform. In some implementations, the transaction history analysis circuit 116 is configured to analyze transaction history to determine possible incentives to offer an entity to join the platform. Incentives may include discounts, fee structures, payment methods, payment terms, underwriting of transactions, and the like. In some implementations, transaction history may be stored using a private permissioned blockchain based distributed network. Transaction volume may be analyzed and compared to other members of the platform to determine platform members have transactions with mutual entities that are not on the platform. This analysis may be done by accessing common shared data being written to the blockchain.

Onboarding circuit 118 may be configured to add an entity to the platform (e.g., a payment platform). This may be based on receiving the acceptance to the offer. In some implementations, the onboarding circuit 118 is configured to add an entity to the platform further based on preapproving a functionality of the platform. Further functionality may also be identified even after an entity has been added to the platform if another functionality or plurality of functionalities is preapproved to the entity subsequent to adding the entity to the platform. In some implementations, the onboarding circuit 118 is configured to send a request for data associated with the additional functionality to the device associated with the entity. In some implementations, the onboarding circuit 118 is configured to receive the data from the device associated with the entity responsive to the request.

Account circuit 120 may be configured to update a node network 109 with account related information. In some implementations, the account circuit 120 is configured to receive data including a first transaction information between a first entity and a second entity. The account circuit 120 may be configured to receive data including a second transaction with the second entity. In some implementations, the account circuit 120 generates data including the strength of connections between the first entity and the second entity (or any respective entity associated with a node in a node network 109) wherein the data may include graphical data that, when displayed on a computing device (e.g., a client computing platform 104) associated with the first business entity, illustrates the strength of the connections between the first entity and the second entity. In some implementations account circuit 120 is configured to update an account of the platform to add an additional functionality. Updating a node network 109 may include creating a new node in the node network associated with a new entity (e.g., a business entity). Updating a node network 109 may include updating a weight of a connection between a first entity and a second entity. The weight of the connection may be updated consequent to receiving data including a transaction between the first entity and the second entity.

In some implementations, server(s) 102, client computing platform(s) 104, and/or external resources 106 may be operatively linked via one or more electronic communication links. For example, such electronic communication links may be established, at least in part, via a network 105 such as the Internet and/or other networks. It will be appreciated that this is not intended to be limiting, and that the scope of this disclosure includes implementations in which server(s) 102, client computing platform(s) 104, and/or external resources 106 may be operatively linked via some other communication media.

A given client computing platform 104 may include one or more processors configured to execute computer program circuits. The computer program circuits may be configured to enable an expert or user associated with the given client computing platform 104 to interface with system 100 and/or external resources 106, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 106 may include sources of information outside of system 100, external entities participating with system 100, and/or other resources. In some implementations, some or all of the functionality attributed herein to external resources 106 may be provided by resources included in system 100.

Server(s) 102 may include electronic storage 108, one or more processors 110, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 108 may comprise non-transitory storage media that electronically stores information. The electronic storage media of electronic storage 108 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 108 may include one or more virtual storage resources (e.g., cloud storage, a virtual private network, and/or other virtual storage resources). Electronic storage 108 may store software algorithms, information determined by processor(s) 110, information received from server(s) 102, information received from client computing platform(s) 104, and/or other information that enables server(s) 102 to function as described herein.

Processor(s) 110 may be configured to provide information processing capabilities in server(s) 102. As such, processor(s) 110 may include one or more of a digital processor, an analog processor, a digital circuit designed to process information, an analog circuit designed to process information, a state machine, and/or other mechanisms for electronically processing information. Although processor(s) 110 is shown in FIG. 1 as a single entity, this is for illustrative purposes only. In some implementations, processor(s) 110 may include a plurality of processing units. These processing units may be physically located within the same device, or processor(s) 110 may represent processing functionality of a plurality of devices operating in coordination. Processor(s) 110 may be configured to execute circuits 112, 114, 116, 118, 120 and/or other circuits. Processor(s) 110 may be configured to execute circuits 112, 114, 116, 118, 120 and/or other circuits by software; hardware; firmware; some combination of software, hardware, and/or firmware; and/or other mechanisms for configuring processing capabilities on processor(s) 110. As used herein, the term "circuit" may refer to any component or set of components that perform the functionality attributed to the circuit. This may include one or more physical processors during execution of processor readable instructions, the processor readable instructions, circuitry, hardware, storage media, or any other components.

It should be appreciated that although circuits 112, 114, 116, 118, 120, and are illustrated in FIG. 1 as being implemented within a single processing unit, in implementations in which processor(s) 110 includes multiple processing units, one or more of circuits 112, 114, 116, 118, 120, and/or may be implemented remotely from the other circuits. The description of the functionality provided by the different circuits 112, 114, 116, 118, 120, and/or described below is for illustrative purposes, and is not intended to be limiting, as any of circuits 112, 114, 116, 118, 120, and/or may provide more or less functionality than is described. For example, one or more of circuits 112, 114, 116, 118, 120, and/or may be eliminated, and some or all of its functionality may be provided by other ones of circuits 112, 114, 116, 118, and/or 120. As another example, processor(s) 110 may be configured to execute one or more additional circuits that may perform some or all of the functionality attributed below to one of circuits 112, 114, 116, 118, and/or 120.

Figure 2:
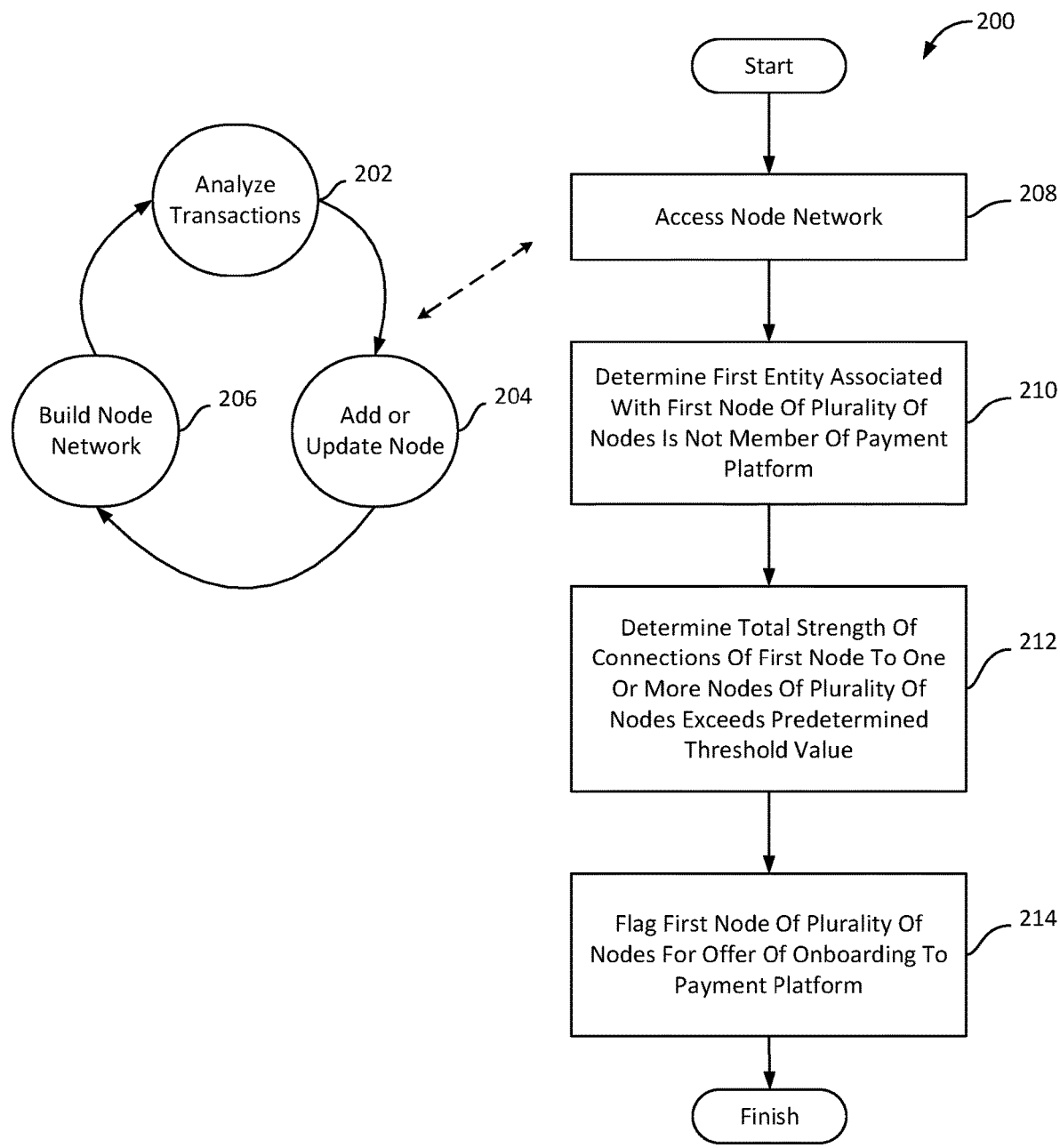
FIG. 2 illustrates a method for selection of entities for an onboarding offer in accordance with one or more implementations.

FIG. 2 illustrates a method 200 for method for selection of entities for an onboarding offer in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. In brief, method 200 may comprise analyzing transactions, adding or updating nodes, and building a node network. Method 200 may further comprise accessing the node network to determine if a first entity (e.g., a business entity) that is associated with a first node of a plurality of nodes is not a member of a payment platform, determine a total strength of connection of the first node to one or more nodes of the plurality of nodes exceeds a predetermined threshold value, and flag the first node of the plurality of nodes for an offer of onboarding to the payment platform.

An operation 202 may include analyzing transactions. In some implementations, this is an ongoing process for construction and updating of a node network. A plurality of nodes of the node network may include data associated with a plurality of entities (e.g., business entities). Analyzing transactions may comprise receiving transaction information between two or more of the plurality of entities and determining a type of the transaction, total number of transactions, frequency of transactions, and the like between two or more of the plurality of entities. In some implementations, the data about the transactions is obtained from a third party source (e.g., external resources 106). In some implementations, analyzing transactions may comprise receiving transaction information where one or both of the entities are not among the plurality of entities associated with the plurality of nodes of the node network. In some implementations, analyzing transactions may comprise receiving transaction information where there is at least one entity among the plurality of entities associated with the plurality of nodes of the node network and at least one entity not among the plurality of entities associated with the plurality of nodes of the node network. In some implementations, transaction history is analyzed by searching for recurring and/or predictable payments or currency transfers. The transaction history may be obtained from existing payment tools being utilized for payment between respective entities. In some implementations, a probability is calculated for ability to make future payments based on recurring financial transactions. In some implementations, the transaction history is analyzed for a predicted fee, rate increase, loss in status, reduced credit rating, reduced opportunity or qualification for offers, and the like. This can be compared against functionality of the platform that can eliminate or mitigate these or similar problems. In some implementations, transaction history is continually analyzed for one or more entities associated with nodes in the node network 109. In some implementations, transaction history is analyzed at a recurring predetermined time (e.g., a day, a week, etc.) or at predetermined intervals before analyzing any new transactions with a respective entity. In some implementations, analyzing new transactions comprises waiting for a predetermined time or time lapse and also waiting for a triggering event, such as a new transaction associated with an entity.

An operation 204 may include adding or updating a node of the node network. accessing a node network. A plurality of nodes of the node network may include data associated with a plurality of entities. When a new entity is identified through analysis of transaction information, a new node of the node network may be created. Strength of connections between nodes may be weighted according to a number of transactions between the respective associated business entities. In some implementations, connections are instead or also weighted based on a type of the transaction, overall total number of transactions, number of transactions within a particular time period (e.g., a window of most recent transactions), frequency of transactions, and the like.

An operation 206 may include building a node network. A plurality of nodes of the node network may include data associated with a plurality of business entities. In some implementations, building a node network associated with entities (e.g., business entities) comprises identifying a new entity. Identification of a new entity may be accomplished through analysis of transaction information, receipt of a request to add a new entity, receipt of third party data identifying transaction associated with a new entity, and the like. In some implementations, building a node network associated with entities comprises updating a connection between two or more existing entities in a node network. Strength of connections between nodes may be weighted according to a number of transactions between the respective associated business entities. In some implementations, connections are instead or also weighted based on a type of the transaction, overall total number of transactions, number of transactions within a particular time period (e.g., a window of most recent transactions), frequency of transactions, and the like.

An operation 208 may include accessing a node network. A plurality of nodes of the node network may include data associated with a plurality of entities (e.g., business entities). Strength of connections between nodes may be weighted according to a number of transactions between the respective associated business entities. In some implementations, connections between nodes indicate a relationship between entities. A subset of entities with nodes in the node network may be participating in a platform (e.g., a payment platform). Connections between nodes may be indicative of types of transactions, a number of transactions, frequency of transactions, other connections between the entities, and the like. In some implementations, the connections between two or more nodes are analyzed to determine if a particular entity may be receptive to an onboarding offer or an offer to learn more about the benefits of a function or feature of the platform. Access to the platform can increase the speed, reliability, cost effectiveness, convenience, and the like of transactions between entities that are part of the platform. In some implementations, information analyzed through transaction history is used to preapprove a functionality available on the platform to include in an offer to join the platform. The transaction history may be obtained from existing payment tools being utilized for payment between respective entities. In some implementations, information analyzed through connections in the node network is used to preapprove a functionality available on the platform to include in an offer to join the platform.

An operation 210 may include determining a first business entity associated with a first node of the plurality of nodes is not a member of a payment platform. In some implementations, data is stored in a respective node of the node network associated with the first business entity indicative of membership of a platform. In some implementations, data is accessed from a respective node of the node network and referenced with other data (e.g., platform membership database data) to determine if the first business entity is already a member of the platform.

An operation 212 may include determining a total strength of connections of the first node to one or more nodes of the plurality of nodes exceeds a predetermined threshold value. The respective associated business entities of the one or more nodes may not be a member of the payment platform. In some implementations, a strength of connection may be determined by a number of transactions, type of transaction, frequency, recurrence, and the like. Strength of connections may also be weighted according to a number of transactions between the respective associated entities, a type of the transaction, total number of transactions, frequency of transactions, and the like. In some implementations, there may be more than one connection between nodes. More than one connections may in some implementations be one or more of type of transaction, direction of transaction, size of transaction, and other ways to sub-divide transactions.

An operation 214 may include flagging the first node of the plurality of nodes for an offer of onboarding to the payment platform consequent to determining the total strength of connections of the first node to the one or more nodes of the plurality of nodes exceeds the predetermined threshold value. In some implementations, flagging the first node of the plurality of nodes requires a further determination of whether the entity associated with the first node is a non-brick-and-mortar vendor or store and associated risks. In some implementations, flagging the first node of the plurality of nodes requires a threshold level of prediction that an entity associated with the first node would be receptive to offer of onboarding. The prediction level may be based on an analysis of transaction history, an analysis of a number of connections between the first node and one or more of the plurality of nodes already a member of the platform reaching a threshold level, an analysis of a strength of a connection between the first node and one or more of the plurality of nodes already a member of the platform reaching a threshold level or levels, a combination of these factors, and the like. The transaction history may be obtained from existing payment tools being utilized for payment between respective entities.

In some implementations, flagged entities may be directed to a landing page, website, application, or sent an offer. In some implementations, the sent offer, landing page, website or landing page uses a user interface to illustrate the connection of the flagged entity to one or more entities that are already members of the platform. A visual indication may be logos or other identifiable visuals related to the one or more entities. In some implementations, the logos or other identifiable visuals may be adjusted regarding size, color, prominence on the screen, and other visual indications to represent a strength of a connection between the respective entity and the one or more entities that are already members of the platform. Other visuals may be displayed indicating advantages and incentives to joining the platform. In some implementations visuals indicating advantages and incentives to joining the platform may indicate which connections to the one or more entities that are already members of the platform would benefit.

Figure 3:
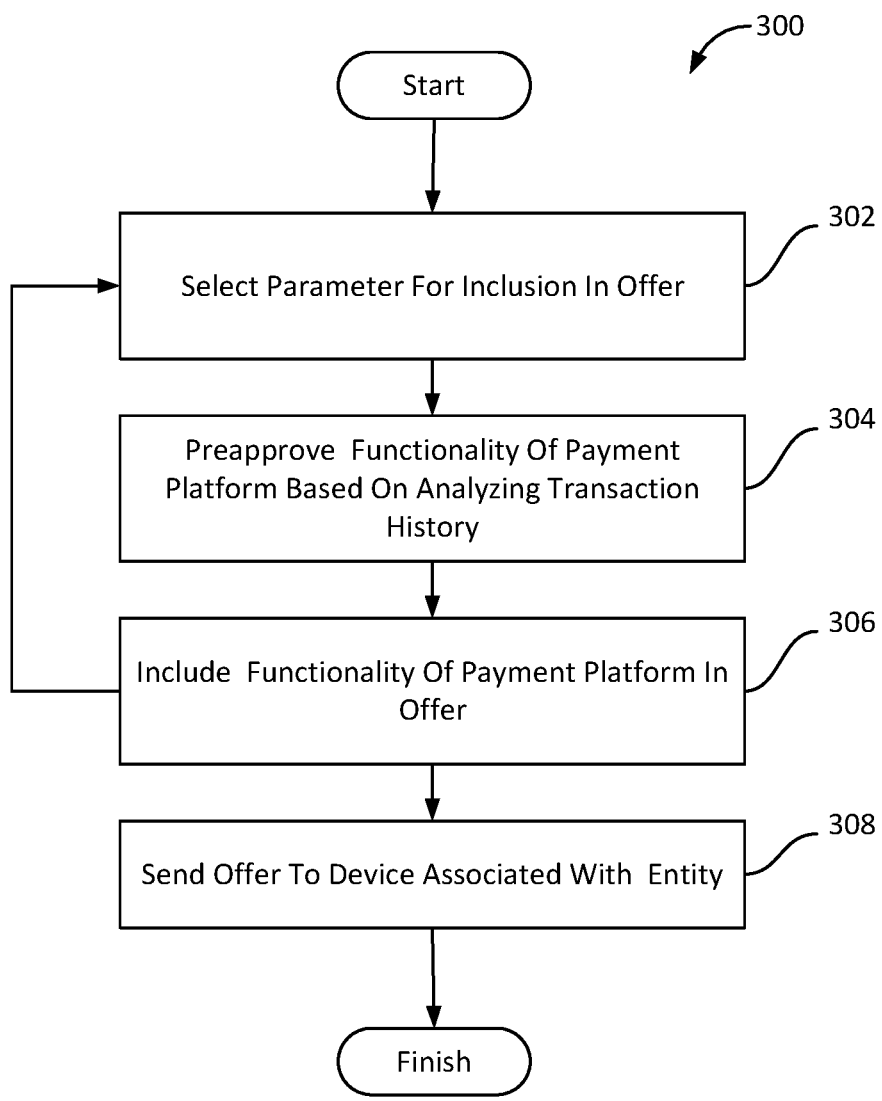
FIG. 3 illustrates a method for pre-approving onboarding to a payment platform in accordance with one or more implementations.

FIG. 3 illustrates a method 300 for pre-approving onboarding to a payment platform in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting. In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. In brief, method 300 may comprise selecting a parameter for inclusion in an offer, preapproving functionality of a payment platform based on analyzing transaction history, including the functionality of the payment platform in the offer, and sending the offer to a device associated with an entity.

An operation 302 may include selecting a first parameter for inclusion in an offer. The first parameter may be associated with a first functionality of a payment platform. Selection of the first parameter may be based on analyzing a transaction history. In some implementations, the parameter is based on a value associated with an incentive. Incentives may include discounts, fee structures, payment methods, payment terms, underwriting of transactions, and the like.

An operation 304 may include preapproving the first functionality of the payment platform based on analyzing the transaction history. In some implementations, the first functionality provides the ability to execute an incentive of an offer. The incentive may be driven by a parameter included in the offer. Selection of the first parameter may be based on analyzing a transaction history. In some implementations, the parameter is based on a value associated with an incentive. Incentives may include discounts, fee structures, payment methods, payment terms, underwriting of transactions, and the like. Analyzing the transaction history may include determining a value associated with the transaction history exceeds a predetermined threshold value. Analyzing the transaction history may include determining types of transactions, total number of transactions, frequency of transactions, and the like between the offeree entity and one or more entities that are members of the platform. Analyzing the transaction history may include determining types of transactions, total number of transactions, frequency of transactions, and the like between two or more entities that have connections to a common entity, wherein the offeree entity can be the common entity of the two or more entities that have connections to a different comment entity. In some implementations, the incentive is calculated to result in a more efficient flow of transactions in a speculative configuration where the offeree entity is assumed to have joined the platform. Incentives may include discounts, fee structures, payment methods, payment terms, push-to-card, reduced costs for entities that are historically cash-based, underwriting of transactions, and the like.

An operation 306 may include including the first functionality of the payment platform in the offer based on preapproving the first functionality of the payment platform. In some implementations, the offer is generated as a landing page, website, application, or the like. In some implementations, the landing page, website or application uses a user interface to illustrate the connection of the flagged entity to one or more entities that are already members of the platform. A visual indication may be logos or other identifiable visuals related to the one or more entities. In some implementations, the logos or other identifiable visuals may be adjusted regarding size, color, prominence on the screen, and other visual indications to represent a strength of a connection between the respective entity and the one or more entities that are already members of the platform. Other visuals may be displayed indicating at least the first functionality as an incentive to join the program. In some implementations visuals indicating the first functionality may indicate which connections to the one or more entities that are already members of the platform will be benefited by the first functionality. In some implementations, the offer comprises an interface for one-click on-boarding or similar equivalent, where the first functionality has been pre-approved and/or activated and only an acceptance is required.

An operation 308 may include sending the offer to a device associated with a first business entity. In some implementations, the offer as sent comprises a landing page, website, application, or the like. In some implementations, the landing page, website or application uses a user interface to illustrate the connection of the flagged entity to one or more entities that are already members of the platform. A visual indication may be logos or other identifiable visuals related to the one or more entities. In some implementations, the logos or other identifiable visuals may be adjusted regarding size, color, prominence on the screen, and other visual indications to represent a strength of a connection between the respective entity and the one or more entities that are already members of the platform. Other visuals may be displayed indicating at least the first functionality as an incentive to join the program. In some implementations visuals indicating the first functionality may indicate which connections to the one or more entities that are already members of the platform will be benefited by the first functionality. In some implementations, the offer comprises an interface for one-click on-boarding or similar equivalent, where the first functionality has been pre-approved and/or activated and only an acceptance is required.

Figure 4:
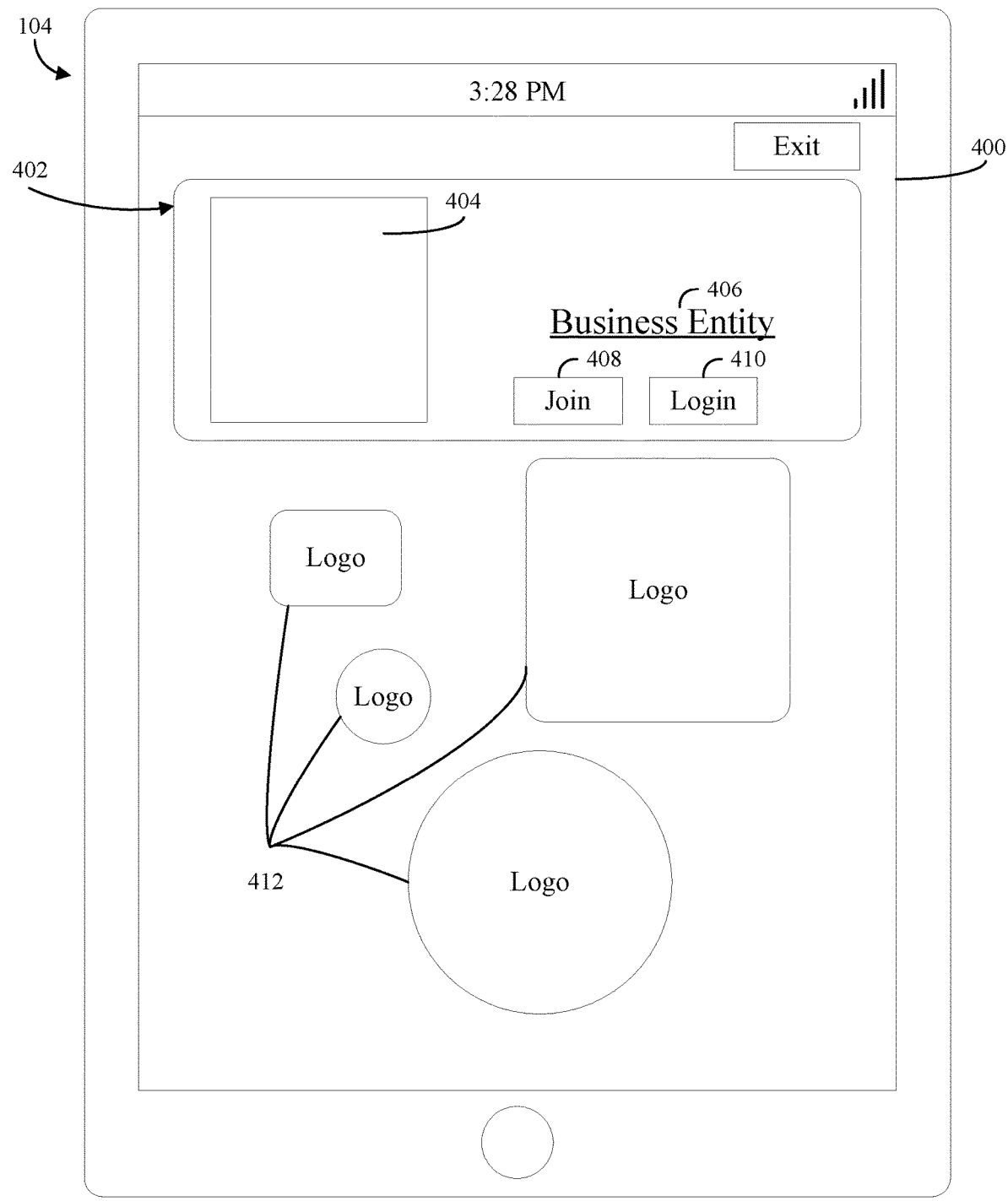
FIG. 4 illustrates a graphical user interface illustrating dynamic logos in accordance with one or more implementations.

Referring now to FIG. 4, an interface 400 on a display of an example client computing platform 104 including entity visuals 412 regarding offers with pre-approved and/or activated functionality according to an example embodiment. The interface 400 on a display of a client computing platform 104 includes an entity information 404, an entity name 406, a join button 408, and a Login button 410. In some embodiments, the join 408 provides access to join a platform (e.g., a payment platform) for one or more accounts of the entity associated with the client computing platform 104. In some implementations, the Login button 410 provides access to the platform that has already been joined.

In some implementations, a graphic is generated based on any received offers for joining a payment platform. The graphic may include visual indications such as logos 412 or other identifiable visuals related to one or more entities. In some implementations, the logos or other identifiable visuals may be adjusted regarding size, color, prominence on the screen, and other visual indications that may represent a strength of a connection between the respective entity associated with the client computing platform 104 and the one or more entities associated with the identifiable visuals that are already members of the platform. Other visuals may be displayed indicating advantages and incentives to joining the platform. In some implementations visuals indicating advantages and incentives to joining the platform may indicate which connections to the one or more entities that are already members of the platform would benefit.

In some implementations, visuals may include pop-up alerts providing more information on incentives offered to join or advantages to joining the platform. In some implementations, a user of the client computing platform 104 can click on the alert to obtain more information on the terms of the offer and/or any advantages and efficiencies in joining. Other visual indicators may include specific information display for various entities displayed as well as more detail on how transactions between one or more of the entities could be simplified upon joining the platform. In some implementations, the offer can be immediately accepted by using a Join button 408.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A system configured for pre-approving onboarding to a payment platform, executing on a processing device, the system comprising:
   one or more hardware processors configured by machine-readable instructions to:
   access a node network, wherein a plurality of nodes of the node network comprise data associated with a plurality of business entities, and wherein strength of connections between nodes are weighted according to a number of transactions between the respective associated business entities;
   determine a first business entity associated with a first node of the plurality of nodes is not a member of a payment platform;
   determine a total strength of connections of the first node to one or more nodes of the plurality of nodes exceeds a predetermined threshold value, wherein the respective associated business entities of the one or more nodes are members of the payment platform;
   flag the first node of the plurality of nodes for an offer of onboarding to the payment platform consequent to determining the total strength of connections of the first node to the one or more nodes of the plurality of nodes exceeds the predetermined threshold value;
   determine a data field required for a pre-approval of a first functionality of the payment platform for the first business entity is incomplete;
   access a permissioned blockchain of the payment platform containing transaction information associated with the plurality of business entities in order to:
   analyze a transaction history associated with the first business entity; and
   analyze a transaction volume of the first business entity, the analysis including a comparison to other members of the payment platform;
   determine a first data to populate the required data field, the determination based at least in part on the analyses of the first business entity completed on the permissioned blockchain;
   select a first parameter for inclusion in the offer, wherein the first parameter is associated with an incentive for the first functionality of the payment platform, wherein the first parameter is selected based at least in part on the analyses of the first business entity completed on the permissioned blockchain and on a plurality of transactions predicted to occur subsequent to the first business entity accepting the offer;
   preapprove the first functionality of the payment platform based on the analyses of the first business entity completed on the permissioned blockchain and on the plurality of transactions predicted to occur subsequent to the first business entity accepting the offer;
   include the first functionality of the payment platform in the offer subsequent to preapproving the first functionality of the payment platform;
   display a visual indication on a screen of a device associated with the first business entity corresponding to the offer, wherein the visual indication comprises logos or other identifiable visuals related to the respective associated business entities of the one or more nodes that are already members of the payment platform, wherein the size, color, or prominence on the screen of the visual indication depicts a strength of a connection between the first business entity and the respective associated business entities of the one or more nodes that are already members of the payment platform;
   receive an acceptance to the offer from the device associated with the first business entity; and
   join the first business entity to the payment platform.

2. The system of claim 1, wherein analyzing the transaction history comprises determining a value of a parameter associated with the transaction history exceeds a second predetermined threshold value.

3. The system of claim 1, wherein joining the first business entity to the payment platform comprises creating an account on the payment platform, a configuration of the created account based on including the first functionality of the payment platform in the offer; and
    wherein joining the first business entity to the payment platform comprises associating the first node with the created account.

4. The system of claim 1, wherein the one or more hardware processors are further configured by machine-readable instructions to:
    identify a second functionality of the payment platform not available to the first business entity subsequent to joining the first business entity to the payment platform;
    send a request for first data associated with the second functionality to the device associated with the first business entity;
    receive the first data from the device associated with the first business entity; and
    update the account of the payment platform to add the second functionality.

5. The system of claim 1, wherein the offer includes data comprising advantages or incentives associated with joining the payment platform.

6. The system of claim 5, wherein the data comprising advantages or incentives associated with joining the payment platform further comprises graphical data that, when displayed on the device associated with the first business entity, illustrates the advantages or incentives associated with joining the payment platform, the illustrated advantages or incentives structured to show which connections to the respective associated business entities provide a benefit to the first business entity upon joining, the respective associated business entities associated with the one or more nodes that are already members of the payment platform.

7. The system of claim 1, wherein the one or more hardware processors are further configured by machine-readable instructions to:
    receive data comprising a first transaction with a second business entity;
    determine the second business entity does not have an associated node in the node network; and
    create a new node in the node network associated with the second business entity.

8. The system of claim 7, wherein the one or more hardware processors are further configured by machine-readable instructions to:
    receive data comprising a second transaction with the second business entity; and
    update a weight of a connection between the first business entity and the second business entity consequent to receiving the data comprising the second transaction.

9. A method of pre-approving onboarding to a payment platform, executing on a processing device, comprising:
    accessing a node network, wherein a plurality of nodes of the node network comprise data associated with a plurality of business entities, and wherein strength of connections between nodes are weighted according to a number of transactions between the respective associated business entities;
    determining a first business entity associated with a first node of the plurality of nodes is not a member of a payment platform;
    determining a total strength of connections of the first node to one or more nodes of the plurality of nodes exceeds a predetermined threshold value, wherein the respective associated business entities of the one or more nodes are members of the payment platform;
    flagging the first node of the plurality of nodes for an offer of onboarding to the payment platform consequent to determining the total strength of connections of the first node to the one or more nodes of the plurality of nodes exceeds the predetermined threshold value;
    determining a data field required for a pre-approval of a first functionality of the payment platform for the first business entity is incomplete;
    accessing a permissioned blockchain of the payment platform containing transaction information associated with the plurality of business entities in order to:
        analyze a transaction history associated with the first business entity; and
        analyze a transaction volume of the first business entity, the analysis including a comparison to other members of the payment platform;
    determining a first data to populate the required data field, the determination based at least in part on the analyses of the first business entity completed on the permissioned blockchain;
    selecting a first parameter for inclusion in the offer, wherein the first parameter is associated with an incentive for the first functionality of the payment platform, wherein the first parameter is selected based at least in part on the analyses of the first business entity completed on the permissioned blockchain and on a plurality of transactions predicted to occur subsequent to the first business entity accepting the offer;
    preapproving the first functionality of the payment platform based on the analyses of the first business entity completed on the permissioned blockchain and on the plurality of transactions predicted to occur subsequent to the first business entity accepting the offer;
    including the first functionality of the payment platform in the offer subsequent to preapproving the first functionality of the payment platform;
    displaying a visual indication corresponding to the offer on a screen of a device associated with the first business entity, wherein the visual indication comprises logos or other identifiable visuals related to the respective associated business entities of the one or more nodes that are already members of the payment platform, wherein the size, color, or prominence on the screen of the visual indication depicts a strength of a connection between the first business entity and the respective associated business entities of the one or more nodes that are already members of the payment platform;
    receiving an acceptance to the offer from the device associated with the first business entity; and
    joining the first business entity to the payment platform.

10. The method of claim 9, wherein analyzing the transaction history comprises determining a value of a parameter associated with the transaction history exceeds a second predetermined threshold value.

11. The method of claim 9, wherein joining the first business entity to the payment platform comprises creating an account on the payment platform, a configuration of the created account based on including the first functionality of the payment platform in the offer; and
    wherein joining the first business entity to the payment platform comprises associating the first node with the created account.

12. The method of claim 9, further comprising:
identifying a second functionality of the payment platform not available to the first business entity subsequent to joining the first business entity to the payment platform;
sending a request for first data associated with the second functionality to the device associated with the first business entity;
receiving the first data from the device associated with the first business entity; and
updating the account of the payment platform to add the second functionality.

13. The method of claim 9, wherein the offer includes data comprising advantages or incentives associated with joining the payment platform.

14. The method of claim 13, wherein the data comprising advantages or incentives associated with joining the payment platform further comprises graphical data that, when displayed on the device associated with the first business entity, illustrates the advantages or incentives associated with joining the payment platform, the illustrated advantages or incentives structured to show which connections to the respective associated business entities would provide a benefit to the first business entity upon joining, the respective associated business entities associated with the one or more nodes that are already members of the payment platform.

15. The method of claim 9, further comprising:
receiving data comprising a first transaction with a second business entity;
determining the second business entity does not have an associated node in the node network; and
creating a new node in the node network associated with the second business entity.

16. The method of claim 15, further comprising:
receiving data comprising a second transaction with the second business entity; and
updating a weight of a connection between the first business entity and the second business entity consequent to receiving the data comprising the second transaction.

17. A non-transient computer-readable storage medium having instructions embodied thereon, the instructions being executable by one or more processors to perform a method for pre-approving onboarding to a payment platform, executing on a processing device, the method comprising:
accessing a node network, wherein a plurality of nodes of the node network comprise data associated with a plurality of business entities, and wherein strength of connections between nodes are weighted according to a number of transactions between the respective associated business entities;
determining a first business entity associated with a first node of the plurality of nodes is not a member of a payment platform;
determining a total strength of connections of the first node to one or more nodes of the plurality of nodes exceeds a predetermined threshold value, wherein the respective associated business entities of the one or more nodes are members of the payment platform;
flagging the first node of the plurality of nodes for an offer of onboarding to the payment platform consequent to determining the total strength of connections of the first node to the one or more nodes of the plurality of nodes exceeds the predetermined threshold value;
determining a data field required for a pre-approval of a first functionality of the payment platform for the first business entity is incomplete;
accessing a permissioned blockchain of the payment platform containing transaction information associated with the plurality of business entities in order to:
analyze a transaction history associated with the first business entity; and
analyze a transaction volume of the first business entity, the analysis including a comparison to other members of the payment platform;
determining a first data to populate the required data field, the determination based at least in part on the analyses of the first business entity completed on the permissioned blockchain;
selecting a first parameter for inclusion in the offer, wherein the first parameter is associated with an incentive for the first functionality of the payment platform, wherein the first parameter is selected based at least in part on the analyses of the first business entity completed on the permissioned blockchain and on a plurality of transactions predicted to occur subsequent to the first business entity accepting the offer;
preapproving the first functionality of the payment platform based on the analyses of the first business entity completed on the permissioned blockchain and on the plurality of transactions predicted to occur subsequent to the first business entity accepting the offer;
including the first functionality of the payment platform in the offer subsequent to preapproving the first functionality of the payment platform;
displaying a visual indication corresponding to the offer on a screen of a device associated with the first business entity, wherein the visual indication comprises logos or other identifiable visuals related to the respective associated business entities of the one or more nodes that are already members of the payment platform, wherein the size, color, or prominence on the screen of the visual indication depicts a strength of a connection between the first business entity and the respective associated business entities of the one or more nodes that are already members of the payment platform;
receiving an acceptance to the offer from the device associated with the first business entity; and
joining the first business entity to the payment platform.

18. The computer-readable storage medium of claim 17, wherein analyzing the transaction history comprises determining a value of a parameter associated with the transaction history exceeds a second predetermined threshold value.

19. The computer-readable storage medium of claim 17, wherein joining the first business entity to the payment platform comprises creating an account on the payment platform, a configuration of the created account based on including the first functionality of the payment platform in the offer; and
wherein joining the first business entity to the payment platform comprises associating the first node with the created account.

20. The computer-readable storage medium of claim 17, wherein the method further comprises:
identifying a second functionality of the payment platform not available to the first business entity subsequent to joining the first business entity to the payment platform;

sending a request for first data associated with the second functionality to the device associated with the first business entity;

receiving the first data from the device associated with the first business entity; and updating the account of the payment platform to add the second functionality.

21. The computer-readable storage medium of claim 17, wherein the offer includes data comprising advantages or incentives associated with joining the platform.

22. The computer-readable storage medium of claim 21, wherein the data comprising advantages or incentives associated with joining the platform further comprises graphical data that, when displayed on the device associated with the first business entity, illustrates the advantages or incentives associated with joining the platform, the illustrated advantages or incentives structured to show which connections to the respective associated business entities would provide a benefit to the first business entity upon joining, the respective associated business entities associated with the one or more nodes that are already members of the payment platform.

23. The computer-readable storage medium of claim 17, wherein the method further comprises:

receiving data comprising a first transaction with a second business entity;

determining the second business entity does not have an associated node in the node network; and creating a new node in the node network associated with the second business entity.

24. The computer-readable storage medium of claim 23, wherein the method further comprises:

receiving data comprising a second transaction with the second business entity; and updating a weight of a connection between the first business entity and the second business entity consequent to receiving the data comprising the second transaction.

* * * * *